United States Patent
Zeng et al.

(10) Patent No.: US 9,650,026 B2
(45) Date of Patent: May 16, 2017

(54) METHOD AND APPARATUS FOR REAR CROSS TRAFFIC AVOIDANCE

(71) Applicant: GM GLOBAL TECHNOLOGY OPERATIONS LLC, Detroit, MI (US)

(72) Inventors: Shuqing Zeng, Sterling Heights, MI (US); Xiang Gong, Rochester, MN (US); Bakhtiar B. Litkouhi, Washington, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 78 days.

(21) Appl. No.: 14/840,407

(22) Filed: Aug. 31, 2015

(65) Prior Publication Data

US 2017/0057474 A1 Mar. 2, 2017

(51) Int. Cl.
| | | |
|---|---|---|
| *G06F 7/70* | (2006.01) | |
| *B60T 7/22* | (2006.01) | |
| *B60T 17/18* | (2006.01) | |
| *B60T 8/17* | (2006.01) | |

(52) U.S. Cl.
CPC .... *B60T 7/22* (2013.01); *B60T 8/17* (2013.01); *B60T 17/18* (2013.01)

(58) Field of Classification Search
CPC ..................................... B60T 7/22; B60T 8/17
See application file for complete search history.

(56) References Cited

U.S. PATENT DOCUMENTS

| | | |
|---|---|---|
| 4,623,966 A | 11/1986 | O'Sullivan |
| 7,385,486 B2 | 6/2008 | Danz et al. |
| 8,232,872 B2 | 7/2012 | Zeng |
| 8,738,264 B1 | 5/2014 | Yopp et al. |
| 9,522,817 B2 * | 12/2016 | Castaneda ........... B66F 9/07581 |
| 2002/0091479 A1 * | 7/2002 | Maruko .................... B60T 7/22 701/96 |
| 2006/0178787 A1 | 8/2006 | McCall |
| 2008/0306666 A1 | 12/2008 | Zeng et al. |
| 2012/0041632 A1 | 2/2012 | Garcia Bordes |
| 2014/0015693 A1 | 1/2014 | Komoguchi et al. |
| 2016/0207530 A1 * | 7/2016 | Stanek .................. B60W 30/09 |

OTHER PUBLICATIONS

Yashushi Aoyagi et al., Development of an Automotive Active Safety System Using a 24 GHz-band High Resolution Multi-Mode Radar, Special Issue—Automobile Electronics, Furukawa Review, No. 44, 2013, pp. 14-19.
Easy reversing out of a parking slot—Rear Cross Traffic Alert (RCTA), downloaded from: http://www.conti-online.com/www/automotive_de_en/themes/passenger_cars/chassis_safety/adas/rcta_en.html ©Continental AG 2015.

\* cited by examiner

*Primary Examiner* — Adam Alharbi
(74) *Attorney, Agent, or Firm* — Quinn IP Law

(57) ABSTRACT

A rear cross traffic avoidance system includes an object detection device sensing remote objects rearward of a host vehicle. An object classifier distinguishes a remote dynamic object from remote static objects. The object classifier identifies a shape of the dynamic object. A tracking system tracks the remote dynamic object. A processor determines the remote object being on an intersecting path to the remote vehicle. The processor determines a warning threat assessment as a function of a time to intersect between the host vehicle and the remote dynamic object. The processor determines a brake threat assessment in response to an actuated warning of a collision. A brake actuation system actuates a braking operation for mitigating the collision.

19 Claims, 8 Drawing Sheets

METHOD AND APPARATUS FOR REAR CROSS TRAFFIC AVOIDANCE

BACKGROUND OF INVENTION

A present invention relates generally to rear cross traffic detection systems.

Collision avoidance systems typically utilize vehicle sensors that provide a velocity of the host vehicle and a position and velocity of target vehicles. Such prior systems are typically deficient for not detecting cross traffic rearward of the vehicle or implementing collision mitigation controls to avoid the accident. Moreover, a target shape and trajectory is typically not considered when assessing the collision threat. In instances where a target is identified as a potential threat, a warning is issued but the system does not continue to monitor the target if a path of travel is made or whether some type of obstacle is blocking the sensed field of the host vehicle. As a result of insufficient data, the system may not take further actions to warn the driver if the target is no longer being detected by the host vehicle.

SUMMARY OF INVENTION

An advantage of an embodiment is a detection of geometric shapes of objects and the tracking of trajectories of the objects for assessing rear cross traffic avoidance situations. The system and technique described herein classifies a path of the host vehicle and the target is either a line or a circle. Based on the trajectory of a path, a center of a warning zone is determined for accurately determining a time to collision. The warning zone provides an early warning detection for identifying potential conflict assessments which may be provided to the driver in the form of a warning. In addition, a safe zone boundary is constructed around the vehicle which functions as a buffer for determining the time to collision. This allows greater reaction time for enabling autonomous vehicle operations, such as vehicle braking, to slow or stop the vehicle to avoid a collision.

An embodiment contemplates a method of an object detection device sensing remote objects rearward of a host vehicle. An object classifier distinguishes a remote dynamic object from remote static objects. The object classifier identifies a shape of the dynamic object. A tracking system tracks the remote dynamic object. A processor determines the remote object being on an intersecting path to the remote vehicle. The processor determines a warning threat assessment as a function of a time to intersect between the host vehicle and the remote dynamic object. The processor determines a brake threat assessment in response to an actuated warning of a collision. A brake actuation system actuates a braking operation for mitigating the collision.

DETAILED DESCRIPTION

Figure 1:
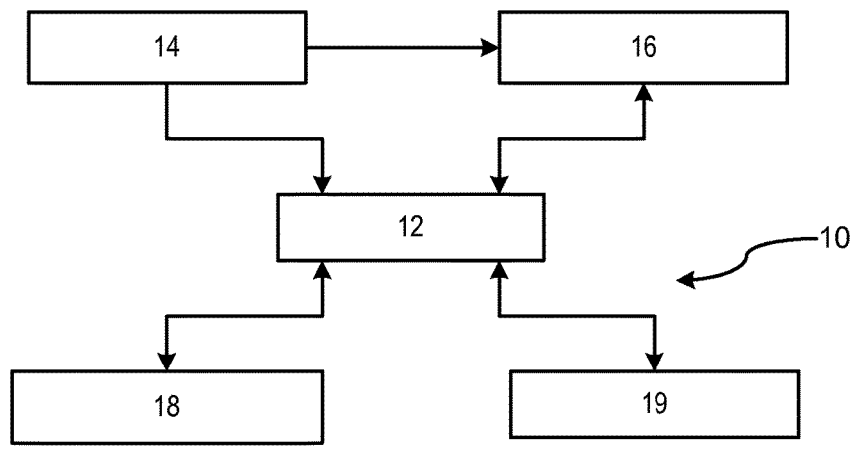
FIG. 1 is a block diagram of components for a rear cross traffic avoidance system.

There is shown in FIG. 1 a block diagram of components for a rear cross traffic avoidance system 10. The rear cross traffic avoidance system includes a processor 12, an object detection device 14, an object classifier 16, a tracking system 18, and a collision mitigation system 19. While the description herein describe automotive systems, it should be readily understood that the rear cross traffic avoidance system can apply to other technology areas including, but not limited to, transportation devices such as forklifts used in assembly facilities, manufacturing facilities, and shipping facilities.

The object detection device 14 senses objects exterior of the vehicle. The object detection device 14 is mounted on the host vehicle facing rearward and senses objects rearward of the vehicle, and more preferably, dynamic objects traveling in a cross-traffic direction to the host vehicle. It should be understood that the object detection device 14 will be used to sense objects both stationary and dynamic; however, the determination of whether the objects are stationary or dynamic is determined by the classifier 16. The classifier 16, based on object detection data, preliminarily determines whether the objects are stationary or dynamic. The classifier 16 utilizes the object detection data for matching whether the data relates to a vehicle or a known stationary object. Determination of whether an object classified as a vehicle is static will be discussed in detail later.

The tracking system 18 tracks objects identified as a vehicle by the classifier 16. The tracking system constructs an occupancy grid and registers stationary objects detected from multiple time frames in local world coordinates. In response to analyzing multiple frames over a period of time, the tracking system 18 determines dynamic vehicles from stationary vehicles. The tracking system removes the stationary objects from the occupancy grid and continues to monitor and track the dynamic objects.

The tracking system 18 tracks the dynamic objects utilizing a proximity of range and bearing-angle data relative to the host vehicle. Clusters are formed based on a geometric shape of the object derived by the data received by the object detection device and the bearing and range-angle data. The tracking system 18 estimates a velocity of each cluster. If the tracking system 18 determines that a consistent velocity of the cluster is not identifiable for the cluster, then a determination is made that the cluster may include two or more distinct dynamic objects, and the cluster will be split into at least two or more clusters until each identified cluster is tracked with a consistent velocity. Tracking a respective cluster at a consistent velocity includes determining that the cluster is moving a respective distance from an initial position at a respective rate.

Figure 2:
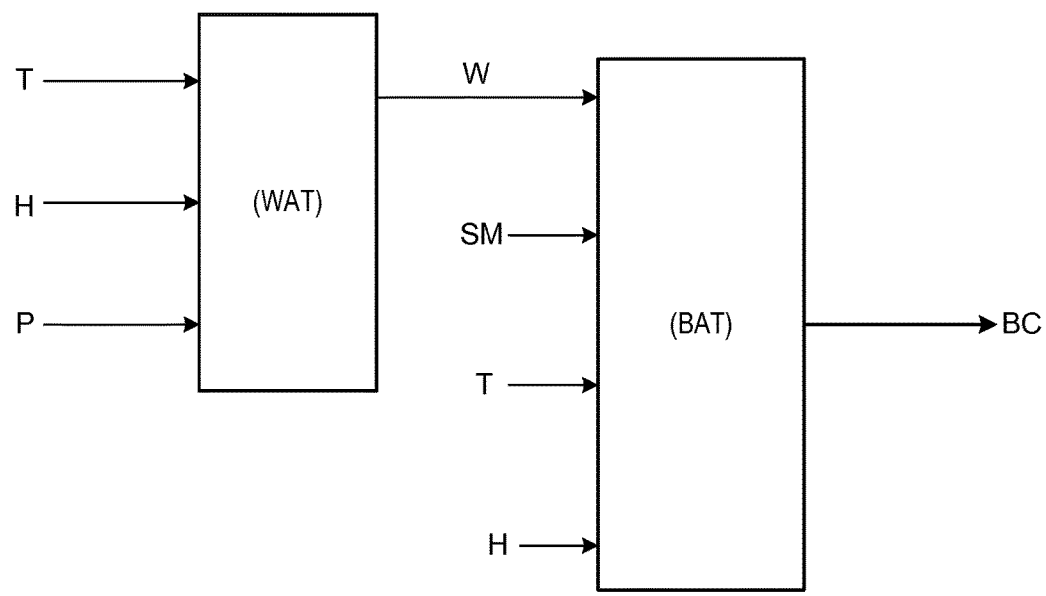
FIG. 2 illustrates a processor inputs for warning and brake assessment threats.

The processor determines both a warning assessment threat (WAT) and a brake assessment threat (BAT) as illustrated in FIG. 2. The warning assessment threat is determined based on the host vehicle and a remote dynamic object being in a warning zone at same instance of time. The processor determines a warning zone relative to the host vehicle and remote dynamic object based on position, velocity, and trajectory of the host vehicle (H) and a position, velocity, and trajectory of a remote dynamic object (T) and other parameters (P). If the determination is made that both host vehicle and the remote dynamic object will occupy the warning zone at a same instance of time then a warning threat assessment is enabled. Enabling a warning threat assessment may be performed utilizing the collision mitigation system where a warning is output to the driver indicating the presence of a remote dynamic object rearward of the host vehicle. The warning may include, but is not limited to, a visual, audible, or haptic warning.

In response to enabling of the warning threat assessment (W), the processor will further determine whether a collision is imminent between the host vehicle and the remote dynamic object based on a time to collision via the brake threat assessment. If a time to collision is determine to exceed a respective threshold, then the processor may provide control signals to the collision mitigation system that utilizes a vehicle operation to avoid the collision. A type of collision mitigation system for mitigating a collision with a rear cross-tracking vehicle may include a braking system that is autonomously actuated for braking the vehicle after an imminent threat assessment is enabled and a warning is provided to the driver. It should be understood that other types of collision mitigation devices may be utilized, including, but is not limited to, steering systems and accelerations systems. As shown in FIG. 2, the brake threat assessment utilizes inputs that include, but are not limited to, safe margin (SM), remote dynamic object information (T), and host vehicle information (H). It should also be understood that the braking command (BC) output from the brake threat assessment will not be actuated unless a warning is output by the warning threat assessment module.

Figure 3:
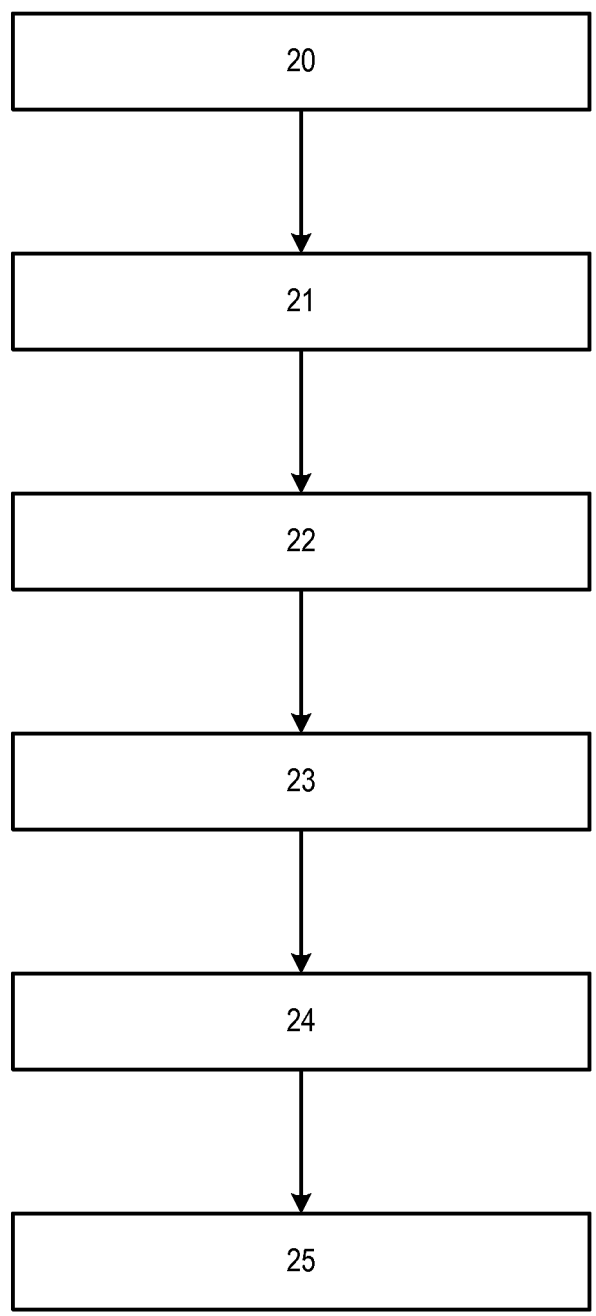
FIG. 3 is a flowchart of a method for executing rear cross traffic avoidance.
Figure 4:
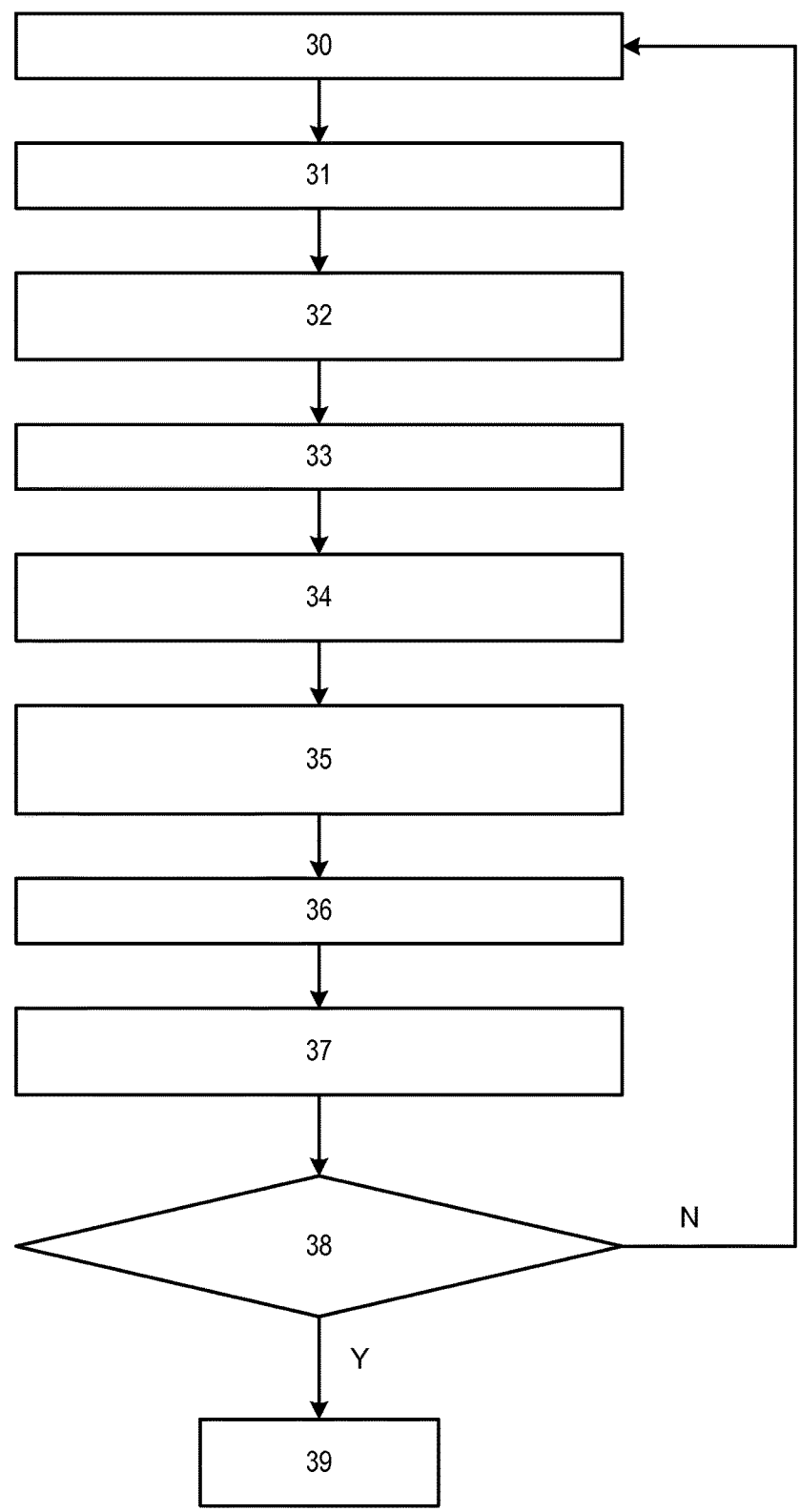
FIG. 4 is a flowchart for an object filter and tracking subroutine

FIG. 3 is a flowchart of a method for executing rear cross traffic avoidance. In step 20, objects are preselected which includes filtering out stationary objects from moving objects. FIG. 4 illustrates a flowchart of a subroutine where stationary objects are filter out from objects in transit.

In step 30, object sensed data is acquired by an object detection device. The object detection device may be a camera, radar, or lidar based device.

In step 31, the object data is provided to a stationary object classifier where objects from the data are classified as stationary that meet the criteria of the classifier.

In step 32, an occupancy grid is constructed. Stationary objects with multiple time frames are registered in their local world coordinates fixed with the ground.

In step 33, stationary objects are removed from the occupancy grid if their ground speed is less than a threshold (e.g., 0.5 meter per second).

In step 34, objects within the occupancy grid remaining after the removal of the stationary objects are clustered based on proximity of range/bearing-angle relative to the host vehicle.

In step 35, a velocity of each cluster is monitored. A technique such as RANSAC least-squares may be used to estimate the velocity of a cluster. If a determination is made that a consistent velocity cannot be identified from a respective cluster, then the determination is made that two or more separate objects are incorrectly clustered. Therefore, the cluster is split until a consistent velocity is identified from each cluster.

In step 36, the cluster is tracked utilizing the geometric shape of the cluster. By tracking the cluster according to its geometric shape, heading and trajectory information can be determined based on the receiving sensed signals returned from the moving object.

In step 37, for each cluster that is identified as a matured target in a tracking database, a position of the target in the local world coordinate frame is computed.

In step 38, the target is tracked continuously to determine if any movement has occurred over the captured time frames to verify that the target is a dynamic object. Verification is established based on whether the target moved at least a predetermined distance within the respective number of captured frames. If the determination is made that the target moved, then the routine proceeds to step 39; otherwise no track is selected and routine returns to step 30 to monitor for additional dynamic targets.

In step 39, the track is selected for further monitoring so as to determine the warning threat assessment.

Figure 5:
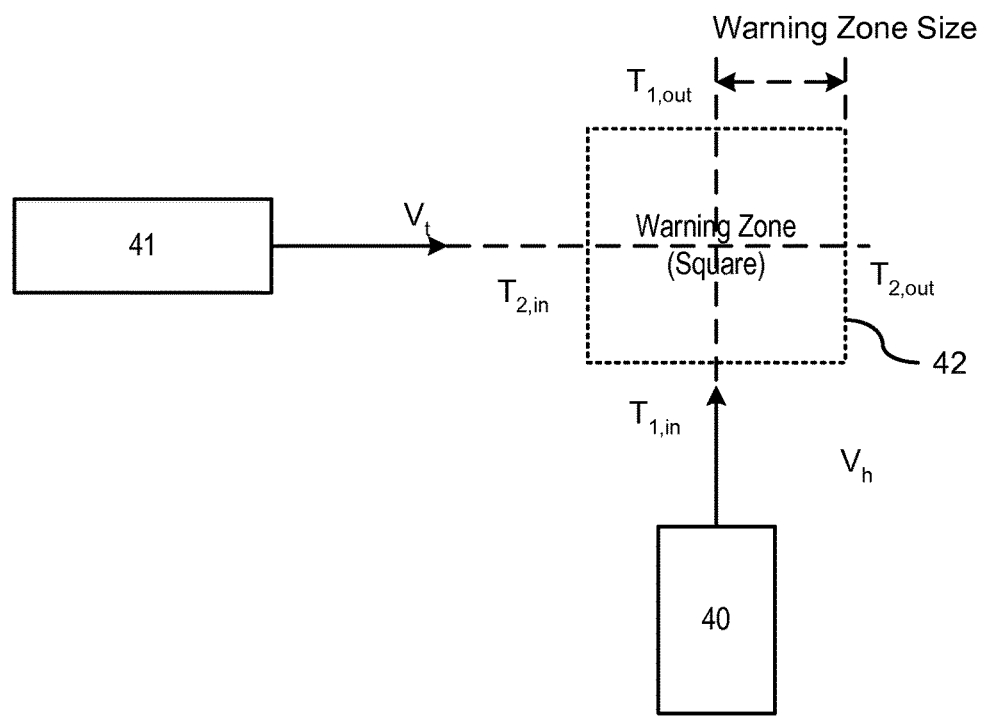
FIG. 5 is a block diagram for determining warning zone center.

Referring again to FIG. 3, a warning threat assessment is executed in step 21. The warning threat assessment defines a warning zone region and determines whether both vehicles will occupy the warning zone region over a same period of time. The warning threat assessment is illustrated by FIG. 5. In FIG. 5, a determination of the warning zone is based on the trajectories of the host vehicle and the object target. Four possible path classifications may be utilized in determining the warning zone center. The possible classifications are: (1) host-line/target-line, (2) host-line/target-circle, (3) host-circle/target-line, (4) host-circle/target-circle. A determination of an intersection of the host and target using any of the combinations may calculated using any known techniques. For exemplary purposes, a technique for determining the host-line/target-line will be described herein; however, it should be understood that the invention is not limited to the technique or classification as described.

FIG. 5 illustrates an example of a host vehicle 40 and a target object 41 traveling along linear paths such as lines/rays. The host vehicle 40 is shown traveling rearward at a velocity having a respective trajectory (e.g., heading). A target object 41 is traveling at a target velocity having a respective trajectory. An intersection of the trajectories of the host vehicle 40 and the target object 41 are shown at a warning zone center ($W_x$, $W_y$). The warning zone center ($W_x$, $W_y$) is determined by the intersection of the two rays generated by the velocities and trajectories of the host vehicle 40 and target object 41. The coordinate frame is referenced with respect to the host vehicle which is positioned at coordinates (0,0). The x-coordinate $W_x$ is determined by the following representation:

$$(W_x, W_y) = (a \cdot V_{hx}, a \cdot V_{hy})$$

where $a = (P_{tx} \cdot V_{ty} - P_{ty} \cdot V_{tx})/(V_{hx} \cdot V_{ty} - V_{hy} \cdot V_{tx})$, coordinates ($P_{tx}$, $P_{ty}$) are positions of a target vehicle, ($V_{hx}$, $V_{hy}$) are velocity representations of the host vehicle, and ($V_{tx}$, $V_{ty}$) are velocity representations of the target vehicle.

A warning zone 42 is constructed based on the warning zone center ($W_x$, $W_y$). The warning zone 42 is constructed based on contour points that define corners of the warning zone 42 such as $W_1$, $W_2$, $W_3$, and $W_4$. Corner points of the warning are represented by the following expressions:

$$W_1 = (W_x - WZ, W_y - WZ);$$

$$W_2 = (W_x - WZ, W_y + WZ);$$

$$W_3 = (W_x + WZ, W_y + WZ), \text{ and}$$

$$W_4 = (W_x + WZ, W_y - WZ).$$

where WZ is an offset distance from the warning zone center and is determined by the following representation:

$$WZ = \max(\min(2, 1 + \max(P_{tx}, P_{ty})/10), 3).$$

Once the warning zone 42 is constructed, determinations may be made in regards to the time frame that the host vehicle 40 and the target object 41 co-exist within the warning zone 42 at a same instance of time. A determination of the host vehicle 40 and the target object 41 occupying the warning zone 42 at a same instance of time requires determining a time when the host vehicle 40 and target object 41 each enter the warning zone 42 and when the host vehicle 40 and the target object 41 exit the warning zone 42 based on their respective velocities and trajectories. Time $t_{1,in}$ represents a time when the host goes into the warning zone 42, whereas $t_{1,out}$ represents a time when the host vehicle exits the warning zone 42. Similarly, time $t_{2,in}$ represents a time when the target vehicle 41 enters the 41 exits the warning zone 42. If an overlap occurs between the time intervals $[t_{1,in}, t_{1,out}]$ and $[t_{2,in}, t_{2,out}]$ as illustrated in FIG. 5, then a determination is made that the target object is a candidate for a potential collision if both vehicles continue at their respective velocities and trajectories.

Referring again to the routine in FIG. 3, a brake threat assessment is determined in step 22. A brake threat assessment is determined based on whether a time to collision exceeds a predetermined threshold where vehicle braking is autonomously applied after the warning is given to the driver and no modifications are made to the host vehicle travel or the remote object travel that would otherwise indicate that a collision threat has been mitigated.

Figure 6:
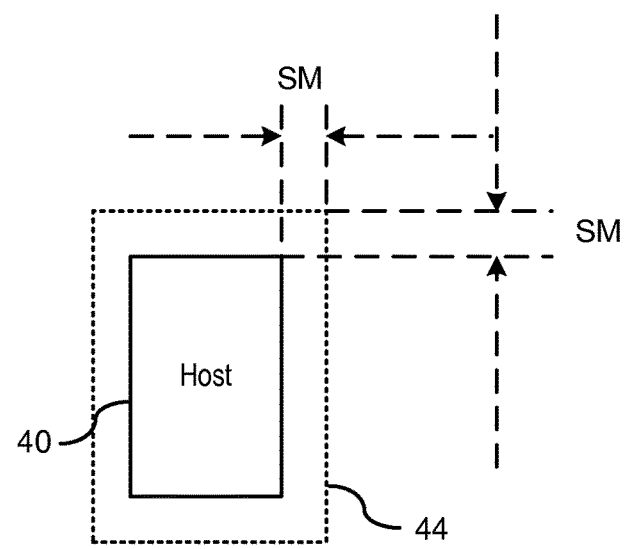
FIG. 6 is an illustration of a safety zone boundary about the vehicle for determining a time to collision.

FIG. 6 illustrates a safety zone constructed around the vehicle for determining whether a collision is imminent such that autonomous braking should be enabled. The host vehicle 40 includes a virtual safety zone 44 formed around the vehicle. The safety zone 44 is an imaginary boundary formed around the vehicle which is used to estimate a time-to-collision with the target object. The safety zone 44 provides a safety buffer/margin for further minimizing a collision with the target object.

The following coordinates define the safety zone of the vehicle and are represented as follows:

(−LS, −WS),
(−LS, +WS),
(+LS, +WS),
(+LS, −WS), where LS=0.5*Length of the host+safe margin, WS=0.5+width of the host+safe margin, and safe margin (SM) is a predetermined distance.

In response to constructing the safety zone 44 around the entire vehicle a velocity of the target object relative to the host vehicle is calculated. A time-to-collision is based on a time that the target object impedes the safety zone 44, as opposed to the time-to-collision with the physical vehicle. As a result, the time-to-collision will be shorter when utilizing the safety zone 44 as opposed to the actual vehicle. This virtually makes the boundary of the host vehicle bigger which provides an enhanced safety buffer for preventing a collision.

If the calculated time-to-collision is less than a time-to-collision threshold ($TTC_{actual} < TTC_{threshold}$), then a brake command is actuated. The brake command will autonomously actuate the vehicle brakes to slow the vehicle to avoid the collision with the target object.

Figure 7:
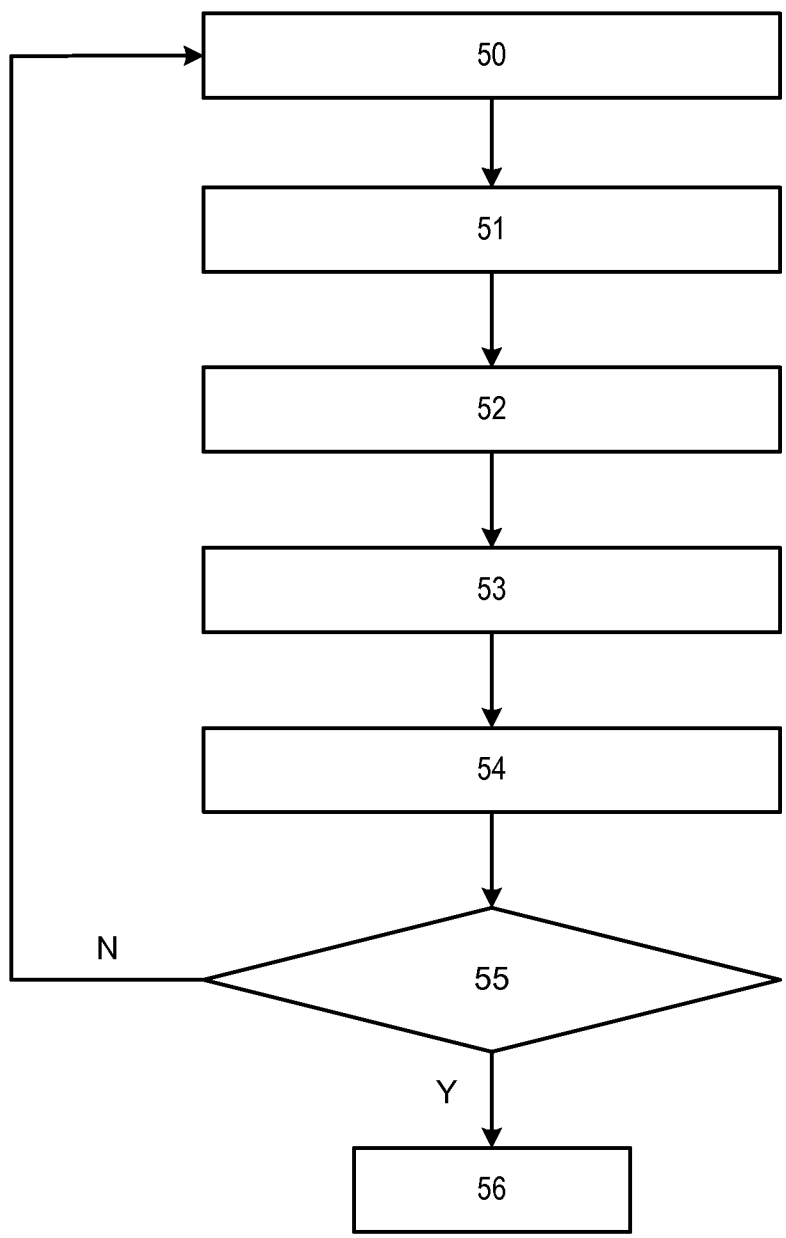
FIG. 7 is a flowchart for constructing a blockage histogram.

FIG. 7 illustrates a flowchart of the technique for the break threat assessment. In step 50, subroutine is initiated. In step 51, the warning zone is identified in the determination is made that the host vehicle and the target object will occupy the warning zone during a same instance of time.

In step 52, a safety zone is constructed around the host vehicle.

In step 53, the relative velocities between the host vehicle and the target object is determined.

In step 54, a time to collision between the host vehicle and the target object is determined. The time to collision is based on the safety zone around the host vehicle as opposed to an actual body component of the host vehicle.

In step 55 a determination is made whether the time to collision is less than a time to collision threshold. If the determination is made that the time to collision is not less than the time to collision threshold, then a return is made to step 50 where the subroutine continues to monitor target objects. If the determination is made that the time to collision is less than the time to collision threshold, then the routine proceeds to step 56.

In step 56, brake commands are transmitted to a braking module for autonomously actuating the vehicle breaks for preventing a collision at the target object.

Figure 8:
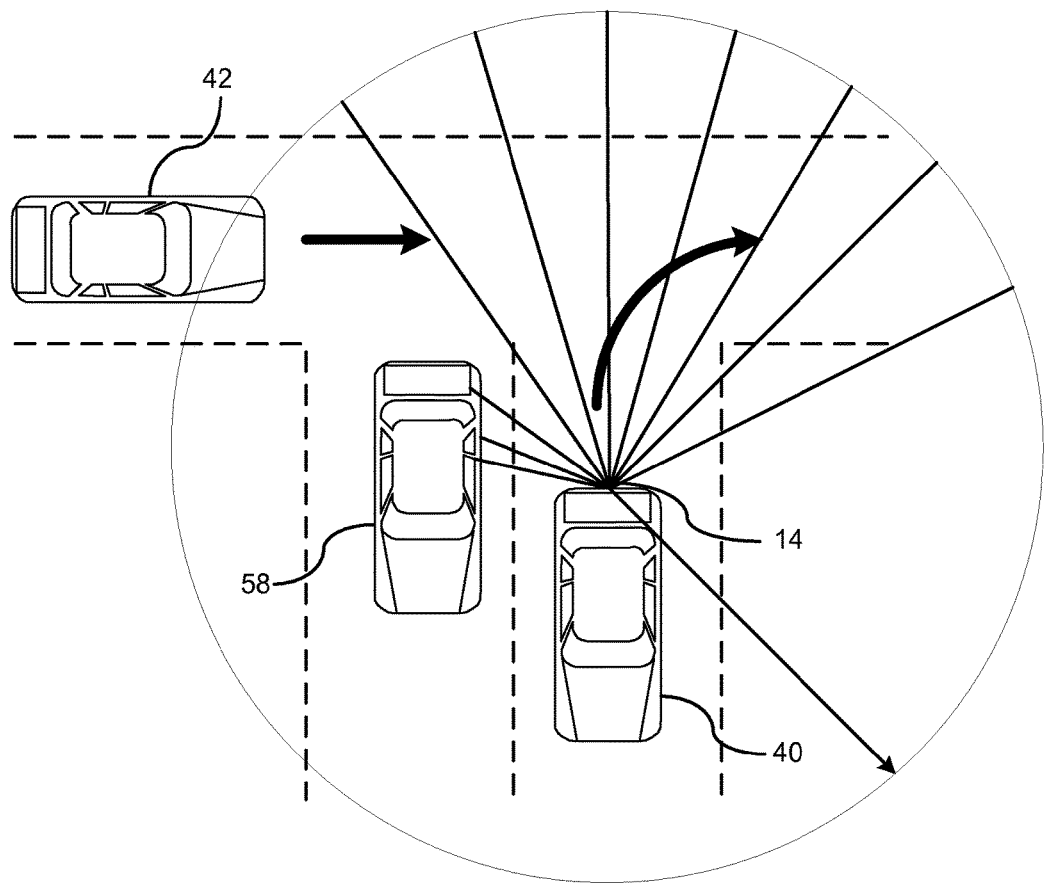
FIG. 8 is an example of an object obstructing producing a blocked view.

Referring again to FIG. 2, in step 23, a determination is made whether the sensor detecting target objects is blocked in any partial form. FIG. 8 illustrates a plan view of vehicle backing up onto a road of travel where cross traffic is present. The host vehicle 40 is shown backing into the road of travel traveled by a target object 42. The object detection device 14 senses objects rearward of the host vehicle 40. As shown in FIG. 8, a stationary object 58 is in a field of view of the object detection device 14 thereby blocking a partial field of view of the signals transmitted by the object detection device 14 for monitoring the target object 42. If a determination is made that blockage or partial blockage of the science field of view is present, then a warning is provided to the driver of the host vehicle 40.

Figure 9:
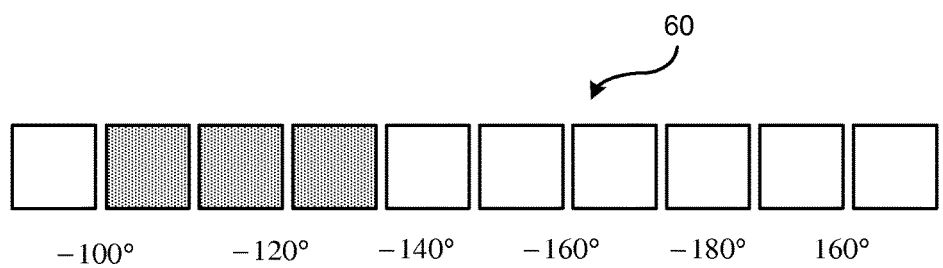
FIG. 9 is an exemplary blockage histogram.

FIG. 9 illustrates a blockage histogram 60 generated by the return data which shows an existing static object is present within a distance (e.g., 2 meters) of the host vehicle 40. As shown by the blockage histogram 60, a portion of the field of view is blocked which is indicated by the shaded region approximately between −100° to −130° of the azimuth angle.

Figure 10:
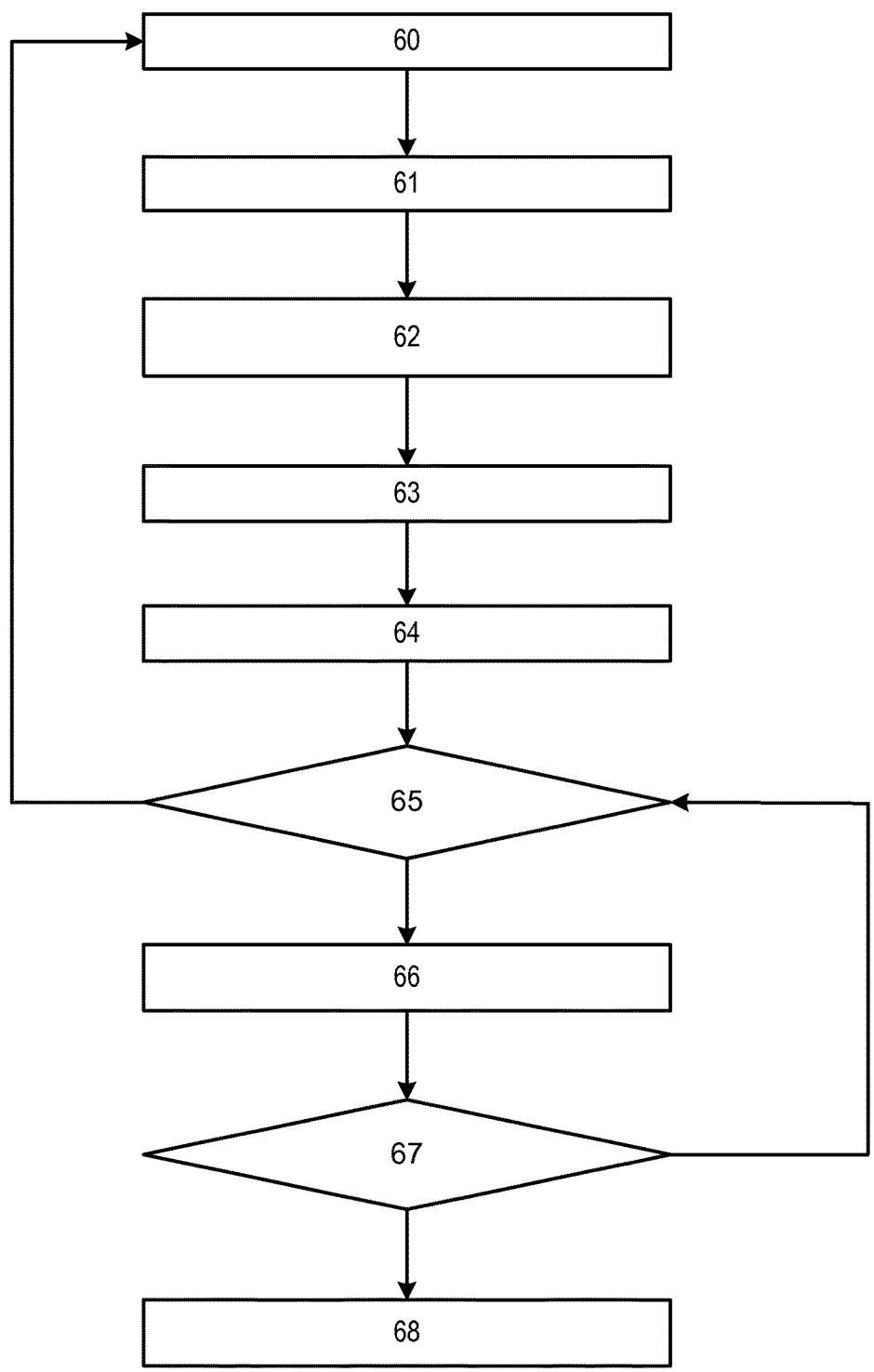
FIG. 10 is a flowchart of a technique for determining whether blockage is present.

FIG. 10 illustrates a flowchart for a technique for determining whether blockage is present. In step 60, radar data is acquired.

In step 61, the quarter data is provided to a classifier where the classifier determines and classifies the object is a stationary object.

In step 62, stationary objects of multiple time frames are registered in local world coordinates (fixed with ground).

In step 63, the stationary objects registered in local world coordinates are transformed to a host vehicle frame.

In step 64, a blockage histogram is constructed utilizing the transform data in the host vehicle frame.

In step 65 a determination is made whether any of the return signals are blocked which is determined based on histogram. If a determination is made that blockage is present, and the routine proceeds to step 66, otherwise, the routine returns to step 62 monitor record data.

In step 66, a blockage flag set is detected in the routine proceeds to step 67.

In block 67 in determination is made whether the host vehicle speed is greater than a predetermined speed. If the determination is made that the host vehicle speed is not greater than the predetermined speed, than the routine returns to step 65 to determine whether blockage is still present. If a determination is made that the host vehicle speed is less than the predetermined speed, then the routine proceeds to step 68.

In step 68, a blockage warning indicator is output to the driver.

Figure 11:
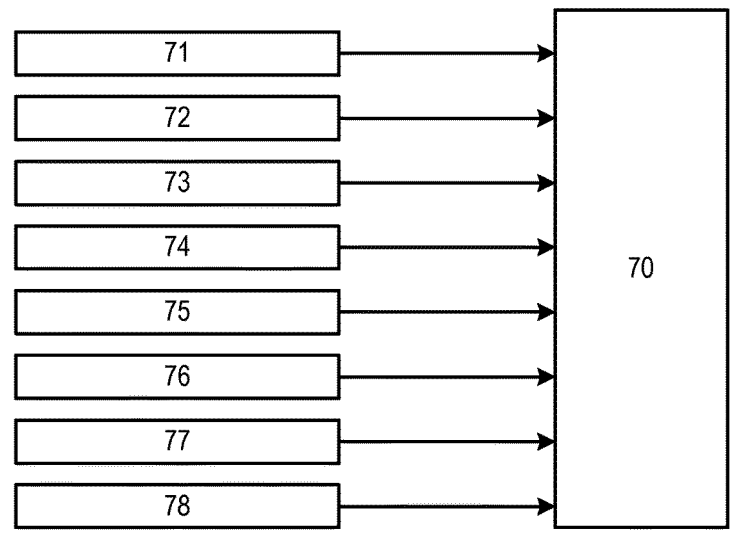
FIG. 11 is block diagram showing exemplary inputs for a state machine.

FIG. 11 illustrates a block diagram for determining a state of the rear cross traffic assessment. Inputs are shown for the state machine as follows. It should be understood that the inputs are only exemplary, and it more or less inputs as shown and described herein may be utilized. The state of the rear cross traffic assessment is determined by warning them brake commands, the state of the host vehicle, and action of the driver. The state machine generates commands to a human machine interface (HMI) and a braking system.

Inputs to a state machine 70 include, but are not limited to, sensor validity information 71, warning command 72, braking commands 73, gear position 74, enable disable commands 75, driver braking action 76, trifle throttle action 77, and velocity of host 78. Based on the current state and conditions that are present, the state machine will determine what state the system should transition to.

The table shown below illustrates conditions for transitioning between different states.

| Condition | Content |
|---|---|
| 1 | RCTA Turning On/Off |
| 2 | Sensor Failure |
| 3 | Target Selected As A Candidate Of Conflict |
| 4 | Warning For Mild Conflict |
| 5 | Brake For Imminent Conflict |
| 6 | Velocity of the Host Is Zero |
| 7 | Brake/Trottle Override Of the Driver |
| 8 | Override Dismiss |
| 9(=5) | Brake For Imminent Conflict |
| 10 | Delay N Seconds |

Figure 12:
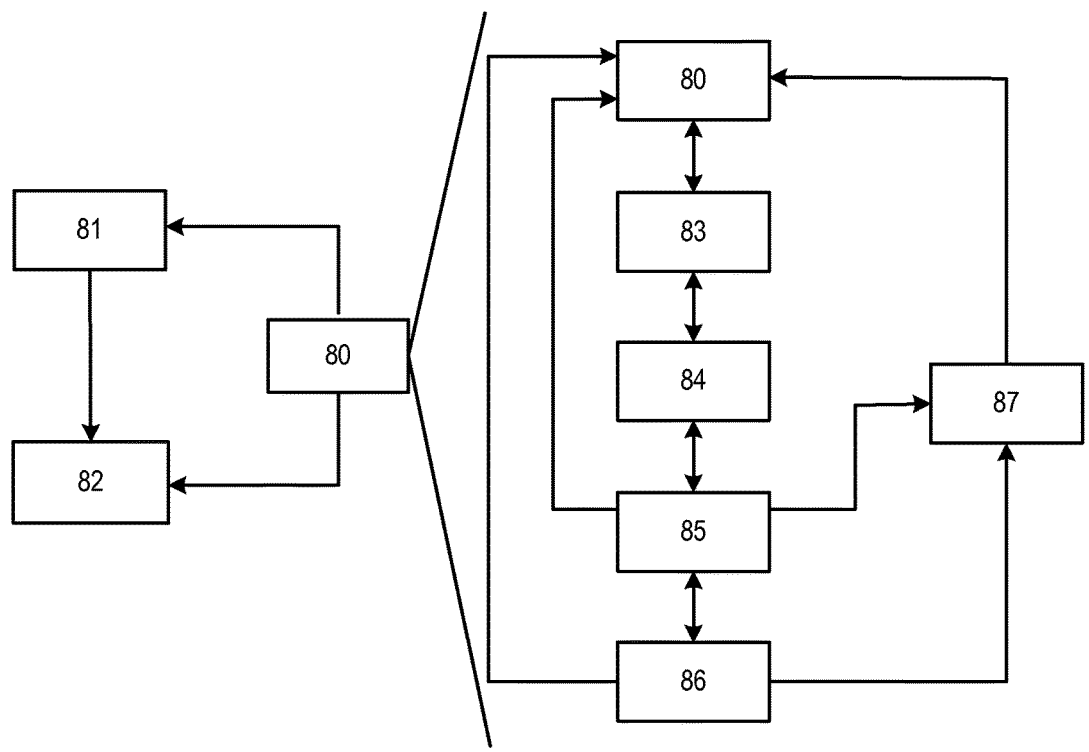
FIG. 12 is a state flow diagram for determining a state of a vehicle during a rear cross traffic assessment.

FIG. 12 illustrates a table identifying the condition required for transitioning between the respective states. The state diagram transitions between an enablement state (state 2) 80, a disabled state (state 1) 81, and a failure state (state 7) 82. As shown in cooperation with the table, the enabled state 80 and disabled state 81 will occur based on the rear cross traffic assessment turning on or off.

A transition from an enable state 82 a failure state 82 will occur based on a sensor failure condition. A transition from the disabled state 81 to the failure state 82 will also occur based on the sensor failure condition.

Various states can be transitioned to when the system is in the enabled state 80. As shown in FIG. 12, from an enable state 80 system transitions to inform state (state 3) 83 upon an informed condition occurring such as a target selected as a candidate for conflict. The inform state 83 may transition to a warning state (state 4) 84 upon a condition occurring such as a warning for mild conflict. The warning state 84 may transition to a braking state (state 5) 85 upon a condition occurring such as a command to break for an imminent collision. A braking state 85 may transition to a brake hold state (state 6) 86 upon a condition occurring that the velocity of the host vehicle is zero. The braking state 85 or the break hold state 86 may transition to an override state based on an override command occurring such as the driver exerting an excessive force on the brakes or exerting an excessive throttle. The override state (state 7) 87 may transition to enable state 80 for re-enabling the system based on an override dismissal occurring.

Referring again to FIG. 2, the command is sent to the HMI for issuing a warning to the driver regarding the impending collision or whether a blockage is occurring. Moreover, in response to issuing a warning and a collision likely occurring based on a calculated time to collision as a function of the safety zone, a command is generated to a collision avoidance system such as an electronic brake control module for autonomously applying the vehicle brakes.

A determination of the warning zone is based on the trajectories of the host vehicle and the object target. Four possible path classifications may be utilized in determining the warning zone center. The possible classifications are: (1) host-line, target-line, (2) host-line, target-circle, (3) host-circle, target-line, (4) host-circle, target-circle.

While certain embodiments of the present invention have been described in detail, those familiar with the art to which this invention relates will recognize various alternative designs and embodiments for practicing the invention as defined by the following claims.

What is claimed is:

1. A rear cross traffic avoidance system comprising:
an object detection device sensing remote objects rearward of a host vehicle;
an object classifier distinguishing a remote dynamic object from remote static objects, the object classifier identifying a shape of the dynamic object;
a tracking system tracking the remote dynamic object, wherein the remote dynamic object forms a cluster;
a processor determining the remote dynamic object being on an intersecting path to the remote vehicle, the processor determining a warning threat assessment as a function of a time to intersect between the host vehicle and the remote dynamic object, the processor determining a brake threat assessment in response to an actuated warning of a collision; and
a brake actuation system actuating a braking operation for mitigating the collision;
wherein the cluster is continuously tracked if a determination is made that the tracked cluster moves at least a predetermined distance from an initial position.

2. The rear cross traffic avoidance system of claim 1 wherein the tracking system generates an occupancy grid and registers stationary objects of multiple frames in local world coordinates, and wherein the tracking system removes stationary objects from the occupancy grid.

3. The rear cross traffic avoidance system of claim 2 wherein the tracking system identifies remaining objects as a function of a proximity of range/bearing-angle data after removal of the stationary objects.

4. The rear cross traffic avoidance system of claim 3 wherein the geometric shape of each cluster is estimated and the cluster is tracked utilizing a world coordinate frame as a function of tracking the geometric shape of the cluster.

5. The rear cross traffic avoidance system of claim 4 wherein the tracking system estimates a velocity of the cluster, and wherein the tracking system splits the cluster into two or more clusters if a consistent velocity is not identified.

6. The rear cross traffic avoidance system of claim 1 wherein the processor determining the warning threat assessment further includes determining a warning zone region, the warning zone region defined by a time that the host vehicle enters and a time the host vehicle exits the region, the warning zone region further defined by a time that the remote dynamic object enters the warning zone region and a time that the and exits the region, and wherein a warning is enabled when a determination is made that the host vehicle and the remote vehicle occupy the warring zone at a same instance of time.

7. The rear cross traffic avoidance system of claim 6 wherein a center of the warning zone region is an intersection a ray of the host vehicle and a ray of the remote dynamic object as represented by the following formula:

$$(W_x, W_y) = (a \cdot V_{hx}, a \cdot V_{hy})$$

where $a = (P_{tx} \cdot V_{ty} - P_{ty} \cdot V_{tx})/(V_{hx} \cdot V_{ty} - V_{hy} \cdot V_{tx})$,
and where a position the hose vehicle is (0,0), $(P_{tx}, P_{ty})$ are positions of a target vehicle, $(V_{hx}, V_{hy})$ are velocity representations of the host vehicle, and $(V_{tx}, V_{ty})$ are velocity representations of the target vehicle.

8. The rear cross traffic avoidance system of claim 7 wherein the warning zone region is defined by corner points, the corner points represented by the following coordinates:

$$W_1: (W_x - WZ, W_y - WZ),$$

$$W_2: (W_x - WZ, W_y + WZ),$$

$$W_3: (W_x + WZ, W_y + WZ),$$

$$W_4: (W_x + WZ, W_y - WZ),$$

where WZ is an offset distance from the warning zone center.

9. The rear cross traffic avoidance system of claim 1 wherein the processor determining a brake threat assessment is determined by a time to collision between the remote dynamic object and a safe zone of the host vehicle is less than a predetermined time to collision threshold, the safe zone representing a virtual boundary around the host vehicle represented by the following coordinates:
- (−LS, −WS);
- (−LS, +WS);
- (+LS, +WS);
- (+LS, −WS);

where LS=0.5*length of the host+safe margin, WS=0.5+ width of the host+safe margin, and the safe margin is a predetermined distance.

10. The rear cross traffic avoidance system of claim 1 wherein the processor determines whether any portion of a sensed field-of-view of the is blocked by a respective stationary object, wherein the blockage warning is output to the driver in response to a determination that any portion of the sensed field-of-view is blocked.

11. The rear cross traffic avoidance system of claim 1 wherein the processor registers stationary objects of multiple time frames in local world coordinates, wherein the registered stationary objects are transformed to the host vehicle frame, wherein a blockage histogram is constructed based on sensed object detection data, wherein blockage from at least one stationary object is determined based on the blockage histogram.

12. The rear cross traffic avoidance system of claim 1 wherein the processor determines a state of the vehicle in determining whether to enable or disable the rear cross traffic avoidance functionality.

13. The rear cross traffic avoidance system of claim 12 wherein if a state of the vehicle is in a braking hold state, then a delay of a predetermined time is executed before enabling rear cross traffic avoidance functionality.

14. The rear cross traffic avoidance system of claim 12 wherein if a target is identified as a remote dynamic object, then the rear cross traffic avoidance functionality is enabled.

15. The rear cross traffic avoidance system of claim 14 wherein if the rear cross traffic avoidance functionality is enabled and a determination is made that the collision possible, then warning state is enabled for warning the driver.

16. The rear cross traffic avoidance system of claim 14 wherein if the warning state is enabled for warning the driver and collision is imminent, then a braking state is enabled for autonomously braking the host vehicle.

17. The rear cross traffic avoidance system of claim 14 wherein if the braking state is enabled for autonomously braking the host vehicle, and if an override operation is detected by the driver, then an override state is enabled and controls of the vehicle brakes are relinquished to the driver.

18. The rear cross traffic avoidance system of claim 17 wherein rear cross traffic avoidance is disabled in response to the enabling of the override state.

19. The rear cross traffic avoidance system of claim 18 wherein if the driver of the host vehicle discontinues operation of the vehicle brakes, then the override state is disabled and the rear cross traffic avoidance is enabled.

* * * * *